US011321574B2

(12) United States Patent
Takahashi et al.

(10) Patent No.: US 11,321,574 B2
(45) Date of Patent: May 3, 2022

(54) VIDEO RECORDING CONTROL DEVICE, VIDEO RECORDING SYSTEM, VIDEO RECORDING METHOD, AND NON-TRANSITORY STORAGE MEDIUM

(71) Applicant: JVCKENWOOD Corporation, Yokohama (JP)

(72) Inventors: Jun Takahashi, Yokohama (JP); Takahisa Suzuki, Yokohama (JP); Toru Doigaki, Yokohama (JP); Takeshi Enokida, Yokohama (JP); Masayuki Nagayama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/008,759

(22) Filed: Sep. 1, 2020

(65) Prior Publication Data

US 2020/0394427 A1    Dec. 17, 2020

Related U.S. Application Data

(63) Continuation of application No. PCT/JP2019/015465, filed on Apr. 9, 2019.

(30) Foreign Application Priority Data

Sep. 13, 2018    (JP) .............................. JP2018-171479

(51) Int. Cl.
*G06K 9/00* (2006.01)
*G06T 7/70* (2017.01)
(Continued)

(52) U.S. Cl.
CPC ..... *G06K 9/00825* (2013.01); *G06K 9/00718* (2013.01); *G06T 7/20* (2013.01);
(Continued)

(58) Field of Classification Search
None
See application file for complete search history.

(56) References Cited

U.S. PATENT DOCUMENTS 9,925,984 B2 *   3/2018  Kato .................... B60W 50/14
2004/0222904 A1 * 11/2004  Ciolli ...................... G08G 1/04
                                                            340/937
(Continued)

FOREIGN PATENT DOCUMENTS

CN    105761500       7/2016
JP    2012-069051     4/2012
(Continued)

OTHER PUBLICATIONS

Extended European Search Report for European Patent Application No. 19859150.5 dated Apr. 16, 2021.
(Continued)

*Primary Examiner* — Delomia L Gilliard
(74) *Attorney, Agent, or Firm* — Amin, Turocy & Watson, LLP

(57) ABSTRACT

A video recording control device includes a data acquisition unit that acquires video data captured by a camera, a traffic guide information acquisition unit that acquires traffic guide information, a different vehicle information detection unit that recognizes a different vehicle from the video data and detects a position and a moving direction of the recognized different vehicle, a traffic guide information correspondence determination unit that associates traffic guide information with the different vehicle, based on the position and the moving direction of the different vehicle, an event detection unit that detects an event in which the different vehicle is involved, and a storage control unit that stores video data corresponding to a period including at least an event occurrence time, with inclusion of the traffic guide information determined by the traffic guide information correspondence (Continued)

determination unit as the traffic guide information that the different vehicle needs to obey.

8 Claims, 6 Drawing Sheets

(51) Int. Cl.
    *G06T 7/20*     (2017.01)
    *G08G 1/01*     (2006.01)
    *G08G 1/04*     (2006.01)
    *G08G 1/056*     (2006.01)
    *G10L 25/51*     (2013.01)
    *H04N 5/76*     (2006.01)

(52) U.S. Cl.
    CPC .............. *G06T 7/70* (2017.01); *G08G 1/0125* (2013.01); *G08G 1/04* (2013.01); *G08G 1/056* (2013.01); *G10L 25/51* (2013.01); *H04N 5/76* (2013.01); *G06K 2009/00738* (2013.01); *G06T 2207/10016* (2013.01); *G06T 2207/30252* (2013.01)

(56) References Cited

U.S. PATENT DOCUMENTS

| | | | |
|---|---|---|---|
| 2008/0189000 A1* | 8/2008 | Duong | B60T 7/22 701/20 |
| 2014/0379211 A1* | 12/2014 | Lo | G01S 13/00 701/36 |
| 2018/0126937 A1* | 5/2018 | De Silva | B60R 21/0136 |
| 2018/0330610 A1* | 11/2018 | Wu | G08G 1/0967 |
| 2018/0357484 A1 | 12/2018 | Omata | |
| 2019/0193659 A1 | 6/2019 | Miyazawa et al. | |

FOREIGN PATENT DOCUMENTS

| | | |
|---|---|---|
| JP | 2015-28711 | 2/2015 |
| JP | 6104482 | 3/2017 |
| WO | 2017/134897 | 8/2017 |
| WO | 2017/193933 | 11/2017 |
| WO | 2019/225053 | 11/2019 |

OTHER PUBLICATIONS

International Search Report and Written Opinion for International Application No. PCT/JP2019/015465 dated Jul. 9, 2019, 8 pages.

* cited by examiner

VIDEO RECORDING CONTROL DEVICE, VIDEO RECORDING SYSTEM, VIDEO RECORDING METHOD, AND NON-TRANSITORY STORAGE MEDIUM

CROSS-REFERENCE TO RELATED APPLICATIONS

This application is a Continuation of PCT International Application No. PCT/JP2019/015465 filed in Japan on Apr. 9, 2019, which claims priority to and incorporates by references the entire contents of Japanese Patent Application No. 2018-171479 filed in Japan on Sep. 13, 2018.

BACKGROUND

1. Technical Field

The present disclosure relates to a video recording control device, a video recording system, a video recording method, and a non-transitory storage medium.

2. Description of the Related Art

A technology for detecting an event on the basis of a driving condition of a subject vehicle and recording event information has been known (for example, Japanese Laid-open Patent Publication No. 2012-69051 (JP-A-2012-69051)).

In JP-A-2012-69051, traffic signal information is acquired, whether a traffic signal is likely to be ignored is detected, and if the traffic signal is highly likely to be ignored, event information is recorded. Specifically, in the technology described in JP-A-2012-69051, if a subject vehicle ignores a traffic signal, it is determined that an event has occurred; therefore, it is difficult to determine, from event recording data, what kind of behavior is performed by a different vehicle with respect to a traffic signal that the different vehicle needs to obey. Therefore, in the technology described in JP-A-2012-69051, it is possible to prove negligence of the subject vehicle, but it may be impossible to prove negligence of the different vehicle. Further, JP-A-2012-69051 does not disclose a technology for providing information on an event that has occurred between different vehicles, where the subject vehicle is not a concerned party but a third party of the event (accident).

SUMMARY

According to an aspect, a video recording control device includes: a data acquisition unit configured to acquire video data that is captured by a camera configured to capture a video of surroundings of a subject vehicle; a traffic guide information acquisition unit configured to acquire traffic guide information that is present in a direction in which the camera captures a video; a different vehicle information detection unit configured to recognize a different vehicle from the video data acquired by the data acquisition unit, and detect a position and a moving direction of the different vehicle; a traffic guide information correspondence determination unit configured to associate traffic guide information that the different vehicle needs to obey with the different vehicle, based on the position and the moving direction of the different vehicle detected by the different vehicle information detection unit; an event detection unit configured to detect an event in which the different vehicle is involved; and a storage control unit configured to, when the event detection unit detects an event, store video data corresponding to a period including at least an event occurrence time, with inclusion of the traffic guide information that is determined by the traffic guide information correspondence determination unit as the traffic guide information that the different vehicle needs to obey.

According to an aspect, a video recording system includes: the video recording control device according to an aspect of the present disclosure; a camera configured to capture a video of surroundings of a subject vehicle; and a storage unit configured to store video data captured by the camera.

According to an aspect, a video recording method includes: a data acquisition step of acquiring video data that is captured by a camera configured to capture a video of surroundings of a subject vehicle; a traffic guide information acquisition step of acquiring traffic guide information that is present in a direction in which the camera captures a video; a different vehicle information detection step of recognizing a different vehicle from the video data acquired at the data acquisition step, and detect a position and a moving direction of the different vehicle; a traffic guide information correspondence determination step of associating traffic guide information that the different vehicle needs to obey with the different vehicle, based on the position and the moving direction of the different vehicle detected at the different vehicle information detection step; an event detection step of detecting an event in which the different vehicle is involved; and a storage control step of storing, when an event is detected at the event detection step, video data corresponding to a period including at least an event occurrence time, with inclusion of the traffic guide information that is determined at the traffic guide information correspondence determination step as the traffic guide information that the different vehicle needs to obey.

According to an aspect, a non-transitory storage medium stores a video recording control program configured to cause a computer to execute: a data acquisition step of acquiring video data that is captured by a camera configured to capture a video of surroundings of a subject vehicle; a traffic guide information acquisition step of acquiring traffic guide information that is present in a direction in which the camera captures a video; a different vehicle information detection step of recognizing a different vehicle from the video data acquired at the data acquisition step, and detect a position and a moving direction of the different vehicle; a traffic guide information correspondence determination step of associating traffic guide information that the different vehicle needs to obey with the different vehicle, based on the position and the moving direction of the different vehicle detected at the different vehicle information detection step; an event detection step of detecting an event in which the different vehicle is involved; and a storage control step of storing, when an event is detected at the event detection step, video data corresponding to a period including at least an event occurrence time, with inclusion of the traffic guide information that is determined at the traffic guide information correspondence determination step as the traffic guide information that the different vehicle needs to obey.

DETAILED DESCRIPTION

Embodiments of the present disclosure will be described in detail below with reference to the accompanying drawings. The present disclosure is not limited by the embodiments below. In addition, in a case where a plurality of embodiments are described, configurations obtained by combining the embodiments are included.

Embodiment

Figure 1:
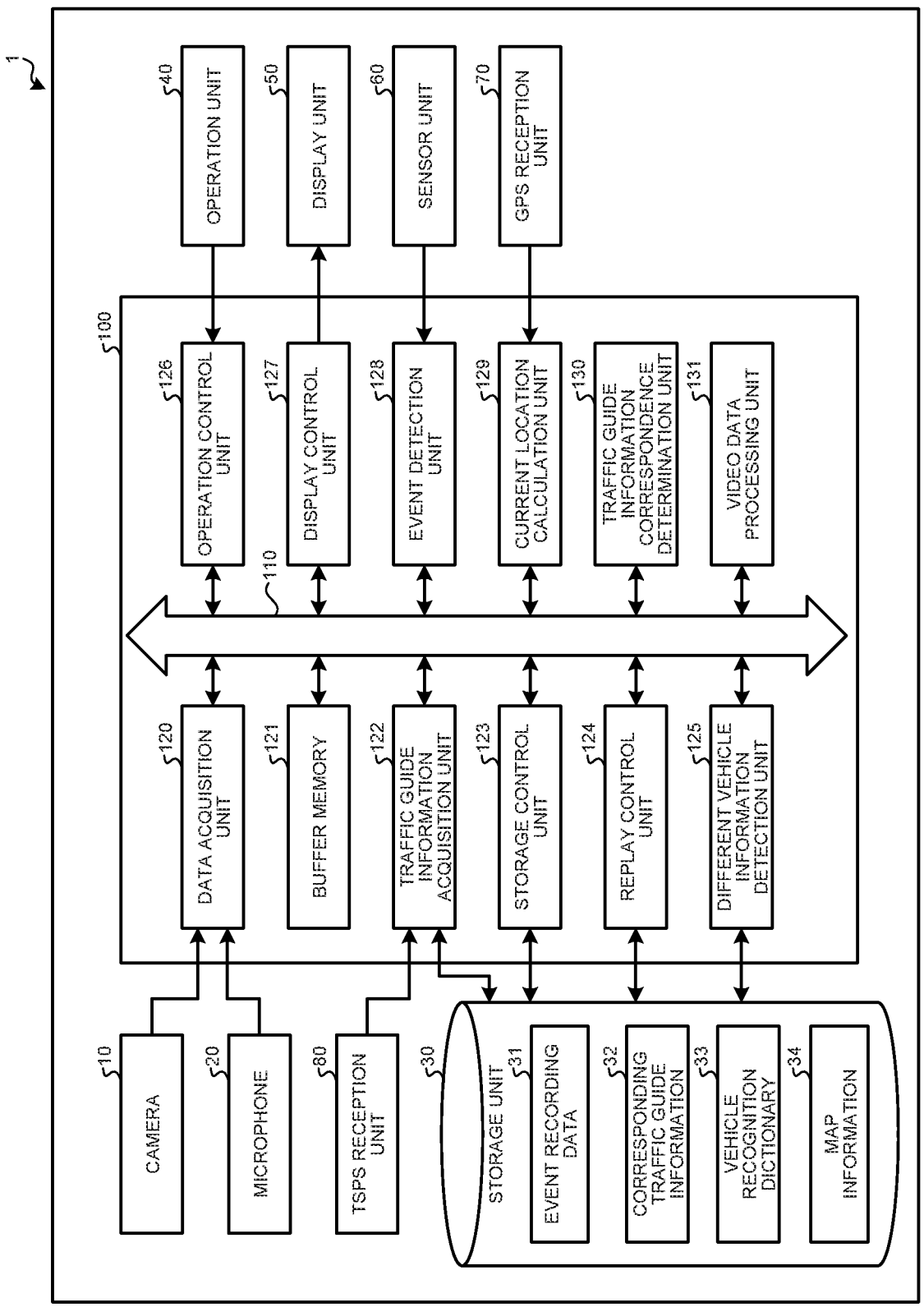
FIG. 1 is a block diagram illustrating an example of a configuration of a video recording system according to the present embodiment.

A configuration of a video recording system according to the present embodiment will be described with reference to FIG. 1. FIG. 1 is a block diagram illustrating an example of a configuration of the video recording system according to the present embodiment.

As illustrated in FIG. 1, a video recording system 1 includes a camera 10, a microphone 20, a storage unit 30, an operation unit 40, a display unit 50, a sensor unit 60, a global positioning system (GPS) reception unit 70, a traffic signal prediction system (TSPS) reception unit 80, and a video recording control device 100. The video recording system 1 is, for example, a driving recorder mounted on a vehicle, and records an event, such as an accident to a different vehicle. The video recording system 1 may be a stand-alone driving recorder, or may be, for example, implemented as a function of a navigation device or a different system mounted on the vehicle.

Figure 2:
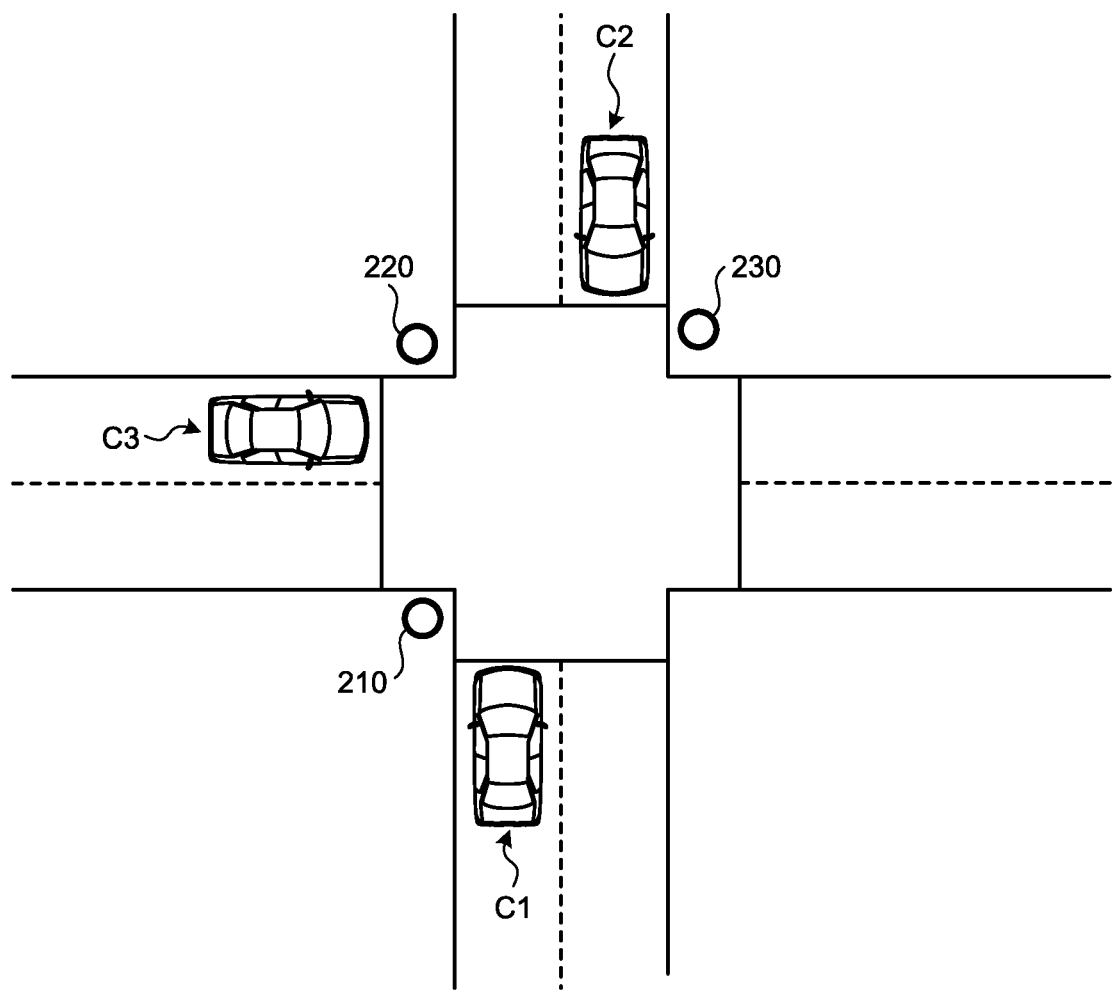
FIG. 2 is a schematic diagram for explaining a subject vehicle and different vehicles.

FIG. 2 is a schematic diagram for explaining a subject vehicle and different vehicles. FIG. 2 illustrates a state in which, at an intersection or the like, a subject vehicle C1, a different vehicle C2, and a different vehicle C3 are stopped at the intersection. The video recording system 1 is mounted on, for example, the subject vehicle C1. In this case, the video recording system 1 captures a video of an area including the different vehicle C2 and the different vehicle C3 that are stopped ahead of the subject vehicle C1. Then, the video recording system 1 records an event, such as an accident, that has occurred between different vehicles, such as the different vehicle C2 and the different vehicle C3. In the following, a case will be described in which the video recording system 1 mounted on the subject vehicle C1 captures a video of the event that has occurred between the different vehicle C2 and the different vehicle C3 and records the captured event; however, this is a mere example, and the present disclosure is not limited to this example.

The camera 10 captures a video of surroundings of the subject vehicle C1. For example, the camera 10 captures a video of a front (in a traveling direction) of the subject vehicle C1. The camera 10 may capture a video of surroundings of the subject vehicle C1. The camera 10 may add, to captured video data, certain information, such as a time stamp or latitude/longitude information, by which a captured date and time and a captured place can be identified. The camera 10 may be implemented by a camera mounted on the driving recorder, for example. The camera 10 outputs the captured video data to a data acquisition unit 120.

The microphone 20 detects sounds around the subject vehicle C1. For example, the microphone 20 acquires a vehicle crash sound in a traffic accident that has occurred around the subject vehicle C1, or voice of a person. The microphone 20 may add, to detected sound data, information on a time, such as a time stamp, by which a detection date and time can be identified. The microphone 20 may be implemented by a general microphone. The microphone 20 outputs the acquired sound to the data acquisition unit 120.

The storage unit 30 stores therein, for example, a program for realizing each of the units of the video recording control device 100. The storage unit 30 may be implemented by a semiconductor memory device, such as a random access memory (RAM), a read only memory (ROM), or a flash memory, or a storage device, such as a hard disk, a solid state drive, or an optical disk. The storage unit 30 stores therein, for example, a vehicle recognition dictionary 33 and map information 34, and further stores therein event recording data 31 and corresponding traffic guide information 32 when an event is detected. The storage unit 30 may be fabricated of a plurality of different memories or the like. Further, map information that is stored in a navigation device or a different device may be used as the map information 34.

The event recording data 31 is video data that includes a video of an event, such as an accident, that has occurred between different vehicles. The event recording data 31 is not limited to an accident, but may be a video of a different event.

The corresponding traffic guide information 32 is traffic guide information that the different vehicles included in the event recording data 31 need to obey, which will be described in detail later. The traffic guide information is, for example, information on a traffic signal or a traffic sign.

The vehicle recognition dictionary 33 is dictionary data for allowing the video recording control device 100 to recognize a vehicle among objects that are included in the video data. In other words, the video recording control device 100 detects a vehicle from the video data on the basis of the vehicle recognition dictionary 33.

Specifically, the video recording control device 100 compares shape data included in the vehicle recognition dictionary 33 and shapes of the objects that are included in the video data, and detects a vehicle included in the video data. Meanwhile, a method of detecting a different vehicle by the video recording control device 100 is not limited to the method as described above. The video recording control device 100 may detect a different vehicle by using other well-known methods.

The map information 34 is information including traffic guide information corresponding to a road, in addition to information on a road and facilities. For example, information on presence or absence of a traffic signal, presence or absence of a halt sign, and speed limit information for each of traveling directions at an intersection or the like are included.

The operation unit 40 receives various kinds of operation on the video recording control device 100 from a user. The operation from the user includes, for example, operation for replaying the event recording data 31 stored in the storage unit 30. The operation unit 40 is implemented by, for example, a physical button or a touch panel arranged in the display unit 50.

The display unit 50 displays various videos. For example, the display unit 50 displays the event recording data 31 stored in the storage unit 30. The display unit 50 is, for example, a display including a liquid crystal display (LCD), an organic electro-luminescence (EL) display, or the like. Meanwhile, the display unit 50 is not limited to the display as described above.

The sensor unit 60 detects various kinds of information on the subject vehicle C1. For example, the sensor unit 60 is an acceleration sensor and detects acceleration applied to the subject vehicle C1. For example, the sensor unit 60 is a gyro sensor and detects information on a posture of the subject vehicle C1. The sensor unit 60 outputs a detection result to an event detection unit 128.

The GPS reception unit 70 includes a GPS reception circuit, a GPS reception antenna, or the like, and receives a GPS signal. The GPS reception unit 70 outputs the received GPS signal to a current location calculation unit 129.

The TSPS reception unit 80 acquires information on a traffic signal that is located around the subject vehicle C1. For example, the TSPS reception unit 80 acquires information on a traffic signal that is located around the subject vehicle C1 from a signal information utilization drive support system. The TSPS reception unit 80 outputs the acquired information on a traffic signal to a traffic guide information acquisition unit 122.

The video recording control device 100 includes the data acquisition unit 120, a buffer memory 121, the traffic guide information acquisition unit 122, a storage control unit 123, a replay control unit 124, a different vehicle information detection unit 125, an operation control unit 126, a display control unit 127, the event detection unit 128, the current location calculation unit 129, a traffic guide information correspondence determination unit 130, and a video data processing unit 131. Each of the units included in the video recording control device 100 may be implemented by an electronic circuit including a central processing unit (CPU), for example. Further, all of the units included in the video recording control device 100 are connected to one another via a bus 110.

The data acquisition unit 120 acquires various kinds of data from outside of the video recording control device 100. For example, the data acquisition unit 120 acquires, from the camera 10, video data captured by the camera 10. For example, the data acquisition unit 120 acquires, from the microphone 20, sound data detected by the microphone 20. Meanwhile, data acquired by the data acquisition unit 120 is not limited to those as described above.

The buffer memory 121 temporarily stores therein various kinds of data. For example, the buffer memory 121 temporarily stores therein video data captured by the camera 10. For example, the buffer memory 121 temporarily stores therein sound data detected by the microphone 20. Meanwhile, data stored in the buffer memory 121 is not limited to those as described above.

The traffic guide information acquisition unit 122 acquires, from the map information 34, traffic guide information that is present around the subject vehicle C1, on the basis of a current location calculated by the current location calculation unit 129. When the camera 10 captures a video in a traveling direction of the subject vehicle C1, the traffic guide information acquisition unit 122 acquires traffic guide information that is present in the traveling direction of the subject vehicle C1, in other words, in a direction in which the camera 10 has captured a video. The traffic guide information acquisition unit 122 acquires, from the TSPS reception unit 80, information on a traffic signal that is located around the subject vehicle C1. Further, the traffic guide information acquisition unit 122 acquires, from the map information 34, information on a traffic sign that is located around the subject vehicle C1. It is sufficient for the traffic guide information acquisition unit 122 to acquire at least traffic guide information that is present in the direction in which the camera 10 has captured a video. For example, in FIG. 2, a first traffic guide 210, a second traffic guide 220, and a third traffic guide 230 are included in an capturing direction of the camera 10 mounted on the subject vehicle C1. Here, the first traffic guide 210 is a traffic guide that the subject vehicle C1 needs to obey. The second traffic guide 220 is a traffic guide that the different vehicle C2 needs to obey. The third traffic guide 230 is a traffic guide that the different vehicle C3 needs to obey. The first traffic guide 210 to the third traffic guide 230 represent, for example, traffic signs or traffic signals that the corresponding vehicles need to obey. In the example illustrated in FIG. 2, the traffic guide information acquisition unit 122 acquires information on the first traffic guide 210 to the third traffic guide 230.

If the first traffic guide 210 to the third traffic guide 230 are traffic signals, the traffic guide information acquisition unit 122 acquires, for example, lighting information on a lighting color of each of the traffic signals. In this case, the traffic guide information acquisition unit 122 acquires, for example, the information on the lighting color of each of the traffic signals on the basis of a TSPS signal that is received by the TSPS reception unit 80. Further, the traffic guide information acquisition unit 122 may acquire the information on the lighting color of each of the traffic signals on the basis of video data captured by the camera 10. Furthermore, the traffic guide information acquisition unit 122 may acquire the information on the lighting colors of the traffic signals at a certain time from the signal information utilization drive support system, on the basis of video data captured by the camera 10 and information on a time added to the video data.

If the first traffic guide 210 to the third traffic guide 230 are traffic signs, the traffic guide information acquisition unit 122 acquires information on each of the traffic signs from the map information 34. Specifically, the traffic guide information acquisition unit 122 acquires, as the information on the traffic signs, information on a stop sign, a through street, a one-way street, or a speed limit, for example. The traffic guide information acquisition unit 122 acquires the information on each of the traffic signs on the basis of a GPS signal received by the GPS reception unit 70, for example. Meanwhile, the information on the traffic signs acquired by the traffic guide information acquisition unit 122 is not limited to those as described above.

The storage control unit 123 stores video data captured by the camera 10 in the buffer memory 121, for example. The storage control unit 123 stores sound data detected by the microphone 20 in the buffer memory 121, for example. The storage control unit 123 stores, as the event recording data 31, video data including at least a video at an occurrence time of an event detected by the event detection unit 128 in the storage unit 30, for example. In this case, for example, the storage control unit 123 reads video data that is captured before the occurrence of an event from the buffer memory 121, and stores, as the event recording data 31, video data including situations before the occurrence of the event and at an event occurrence time in the storage unit 30. The storage control unit 123 may store the video data captured by the camera 10 in an overwritable manner in the storage unit 30 via the buffer memory 121, and may store the event recording data 31 in an overwriting inhibited manner in the storage unit 30 if the event detection unit 128 detects an event. The storage control unit 123 may store the stored event recording data 31 as data for which falsification is inhibited or data for which deletion is inhibited for a predetermined period.

Specifically, for example, when the event detection unit 128 detects an event, the storage control unit 123 stores, in the storage unit 30, video data corresponding to a period including at least the event occurrence time, with inclusion of traffic guide information that is determined by the traffic guide information correspondence determination unit 130 as traffic guide information that a different vehicle needs to obey. The storage control unit 123 stores the video data corresponding to a period including at least the event occurrence time and the corresponding traffic guide information 32 in the storage unit 30 such that at least only the video data corresponding to a period including at least the event occurrence time is playable. The storage control unit 123 stores the video data corresponding to a period including at least the event occurrence time and the corresponding traffic guide information 32 that is traffic guide information that the different vehicle needs to obey in the storage unit 30 such that the video data including the traffic guide information is playable. In other words, the storage control unit 123 independently stores each of the event recording data 31 and the corresponding traffic guide information 32 in the storage unit 30, for example.

The replay control unit 124 replays the event recording data 31 in accordance with an instruction from the operation control unit 126, for example. The replay control unit 124 replays the event recording data 31 independently of the corresponding traffic guide information 32, for example. The replay control unit 124 replays the event recording data 31 on which the corresponding traffic guide information 32 is superimposed, for example. The replay control unit 124 outputs replay data of the event recording data 31 to the display control unit 127, for example. The replay control unit 124 outputs replay data of the event recording data 31 on which the corresponding traffic guide information 32 is superimposed to the display control unit 127, for example.

The different vehicle information detection unit 125 recognizes a different vehicle included in the video data that is acquired by the data acquisition unit 120 from the camera 10, for example. Specifically, the different vehicle information detection unit 125 recognizes a different vehicle included in the video data that is acquired by the data acquisition unit 120 from the camera 10, on the basis of the vehicle recognition dictionary 33, for example. The different vehicle information detection unit 125 may detect a different vehicle by using other well-known methods, instead of using the vehicle recognition dictionary 33. The different vehicle information detection unit 125 detects a position and a moving direction of the recognized different vehicle, for example. In addition, the different vehicle information detection unit 125 further detects a transition of movement of the recognized different vehicle. The different vehicle information detection unit 125 outputs a detection result to the event detection unit 128, for example. The different vehicle information detection unit 125 may recognize a different vehicle in the event recording data.

The operation control unit 126 receives an operation signal that is related to replay of the event recording data 31 and that is received by the operation unit 40 from a user, for example. The operation control unit 126 causes the replay control unit 124 to replay the event recording data 31 on the basis of the operation signal, for example. Further, the operation control unit 126 receives an operation signal that is related to an event recording instruction and that is received by the operation unit 40 from a user. If the operation control unit 126 receives the operation signal related to the event recording instruction, the storage control unit 123 handles, as an event occurrence time, a time at which the operation signal related to the event recording instruction is received, and stores video data including the event occurrence time as the event recording data 31 in the storage unit 30.

The display control unit 127 displays a video on the display unit 50, for example. For example, the display control unit 127 displays the event recording data 31 on the display unit 50 under the control of the replay control unit 124. For example, the display control unit 127 displays a video in which the corresponding traffic guide information 32 is superimposed on the event recording data 31, on the display unit under the control of the replay control unit 124.

The event detection unit 128 detects an event in which a different vehicle is involved, for example. For example, if a different vehicle does not obey a traffic guide that the different vehicle needs to obey, the event detection unit 128 detects this situation as an event. For example, the event detection unit 128 detects a traffic accident that has occurred between different vehicles as an event. For example, the event detection unit 128 detects an event in which a different vehicle is involved, on the basis of the transition of movement of the different vehicle recognized by the different vehicle information detection unit 125. For example, the event detection unit 128 detects an event in which a different vehicle is involved, on the basis of the transition of movement of the different vehicle recognized by the different vehicle information detection unit 125 and sound data detected by the microphone 20. In this case, for example, the event detection unit 128 detects the event in which the different vehicle is involved, on the basis of a scream of a person or a crash sound detected by the microphone 20. For example, the event detection unit 128 detects an event in which a different vehicle and the subject vehicle are involved, on the basis of the transition of movement of the different vehicle recognized by the different vehicle information detection unit 125 and acceleration that is applied to the subject vehicle and that is detected by the sensor unit 60. In this case, for example, if the event detection unit 128 detects negative acceleration due to hard braking or the like detected by the sensor unit 60, the event detection unit 128 detects the event in which the different vehicle and the subject vehicle are involved.

The transition of the different vehicle detected as an event is, for example, a case in which the different vehicle recognized by the different vehicle information detection unit 125 suddenly stops while moving.

The current location calculation unit 129 acquires a GPS signal from the GPS reception unit 70. The current location calculation unit 129 calculates a current location of the subject vehicle on the basis of the GPS signal, for example.

The traffic guide information correspondence determination unit 130 associates traffic guide information that a different vehicle needs to obey and that is acquired by the traffic guide information acquisition unit 122 with the different vehicle, on the basis of a position and a moving direction of the different vehicle detected by the different vehicle information detection unit 125, for example. Specifically, the traffic guide information correspondence determination unit 130 visually associates the traffic guide information that the different vehicle needs to obey with the different vehicle, for example. The traffic guide information correspondence determination unit 130 outputs the associated traffic guide information to the storage control unit 123.

The video data processing unit 131 performs various kinds of processing on video data captured by the camera 10, for example. The video data processing unit 131 superimposes traffic guide information that is stored as another video data for which a positional relationship is consistent with the video data corresponding to a period including at least the event occurrence time, on the video data corresponding to the event occurrence time.

Figure 3:
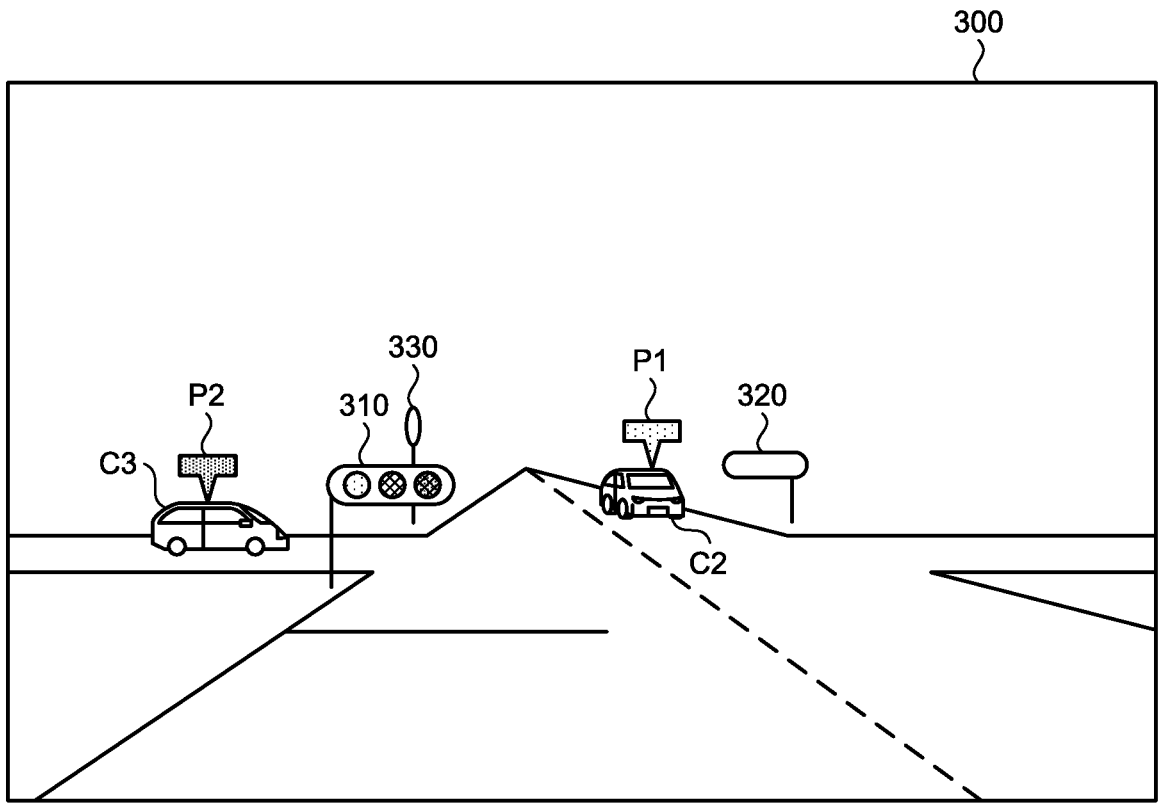
FIG. 3 is a diagram illustrating an example of a video that is obtained before event detection, with respect to event recording data based on event detection according to the present embodiment.
Figure 4:
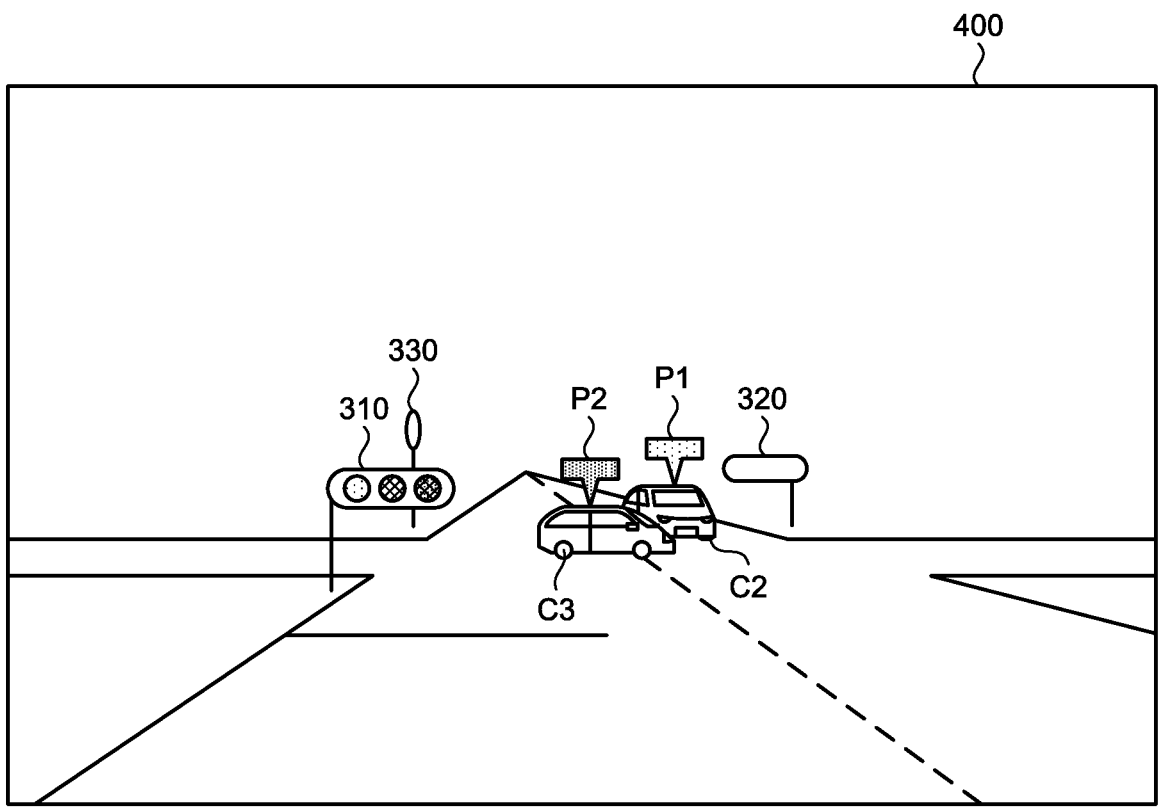
FIG. 4 is a diagram illustrating an example of a video that is obtained at the time of the event detection, with respect to the event recording data based on the event detection according to the present embodiment.

Referring to FIG. 3 and FIG. 4, processes performed by the video recording system 1 will be described in detail. FIG. 3 is a diagram illustrating an example of a video that is obtained before event detection, with respect to event recording data that is stored based on event detection according to the present embodiment. FIG. 4 is a diagram illustrating an example of a video that is obtained at the time of the event detection, with respect to the event recording data that is stored based on the event detection according to the present embodiment.

Event recording data 300 illustrated in FIG. 3 is video data that is obtained by the subject vehicle C1 by capturing a video of the different vehicle C2 and the different vehicle C3 located ahead in FIG. 2 before an event is detected.

The event recording data 300 includes a first traffic signal 310, a second traffic signal 320, and a third traffic signal 330 as traffic guide information. In other words, it is determined, from the map information 34, that traffic signals including at least the first traffic signal 310, the second traffic signal 320, and the third traffic signal 330 are located in the traveling direction of the subject vehicle C1 and in the capturing direction of the camera 10 mounted on the subject vehicle C1. In this case, the traffic guide information acquisition unit 122 acquires lighting information on the first traffic signal 310 to the third traffic signal 330. In this example, it is assumed that the traffic guide information acquisition unit 122 acquires information indicating that lighting colors of the first traffic signal 310 and the second traffic signal 320 are green and a lighting color of the third traffic signal 330 is red.

In the event recording data 300, different vehicles are recognized through a recognition process performed by the different vehicle information detection unit 125, and the transitions of movement of the different vehicles are detected on the basis of positions of the different vehicles among frames included in the video data. In FIG. 3 and FIG. 4, the different vehicle C2 and the different vehicle C3 are detected as the different vehicles.

The traffic guide information correspondence determination unit 130 associates the lighting information on the second traffic signal 320 with the different vehicle C2. In the example illustrated in FIG. 3, the traffic guide information correspondence determination unit 130 associates the lighting information indicating that the second traffic signal 320 is in green with the different vehicle C2 at the time the video illustrated in FIG. 3 is captured. The traffic guide information correspondence determination unit 130 associates the lighting information on the third traffic signal 330 with the different vehicle C3. In the example illustrated in FIG. 3, the traffic guide information correspondence determination unit 130 associates the lighting information indicating that the third traffic signal 330 is in red with the different vehicle C3 at the time the video illustrated in FIG. 3 is captured. The storage control unit 123 stores, as the corresponding traffic guide information 32, the traffic guide information associated with each of the different vehicles in the storage unit 30.

Then, as illustrated in FIG. 3, the display control unit 127 displays, as the corresponding traffic guide information 32, a word balloon P1 in a superimposed manner at a position corresponding to the different vehicle C2 in the event recording data 300, for example. In this case, for example, the display control unit 127 displays the word balloon P1 in a green color in accordance with the lighting information on the second traffic signal 320. Moreover, for example, the display control unit 127 may display text, such as "the lighting color of the second traffic signal 320 is green", in the word balloon P1.

Furthermore, the display control unit 127 displays, as the corresponding traffic guide information 32, a word balloon P2 in a superimposed manner at a position corresponding to the different vehicle C3 in the event recording data 300, for example. In this case, for example, the display control unit 127 displays the word balloon P2 in a red color in accordance with the lighting information on the third traffic signal 330. Furthermore, for example, the display control unit 127 may display text, such as "the lighting color of the third traffic signal 330 is red" in the word balloon P2.

Event recording data 400 illustrated in FIG. 4 is video data at the time of event detection obtained by the subject vehicle C1 by capturing a video of the different vehicle C2 and the different vehicle C3 located forward of the subject vehicle C1 in FIG. 2.

When an accident is occurred between the different vehicle C2 and the different vehicle C3, the word balloon P1 is superimposed at a position corresponding to the different vehicle C2 in the event recording data 400 and the word balloon P2 is superimposed at a position corresponding to the different vehicle C3 in the event recording data 400. In other words, in the event recording data 400, the traffic guide information that the different vehicle C2 needs to obey and the traffic guide information that the different vehicle C3 needs to obey at the time of occurrence of the event are indicated. Further, in FIG. 4, it is indicated that the different vehicle C3 has not obeyed display of the third traffic signal 330. In this case, the event detection unit 128 detects, as an event, a situation in which the different vehicle C3 has ignored the third traffic signal 330 and the accident involving the different vehicle C2 has occurred. Further, the storage control unit 123 records a video corresponding to a period between the time at which the event detection unit 128 detected the event, inclusive, and a time a predetermined time (for example, 5 seconds) therebefore, inclusive, so that it is possible to record the accident that has occurred involving the different vehicle C2 because the different vehicle C3 has ignored the third traffic signal 330, for example. For example, it is sufficient for the storage control unit 123 to record a video from a time at which the different vehicle C3 ignored the display of the third traffic signal 330 to a time at which the accident occurred involving the different vehicle C2. It is sufficient for the storage control unit 123 to read the video corresponding to a period before the occurrence of the event from the buffer memory 121.

In FIG. 3 and FIG. 4, the event detection unit 128 detects the accident between the different vehicles as an event, but this is a mere example, and the present disclosure is not limited to this example. It may be possible to detect, as an event, an accident between a different vehicle and an object, such as a person. In this case, the traffic guide information correspondence determination unit 130 may associate traffic guide information that the person needs to obey with the person. With this configuration, by checking the event recording data, it is possible to easily distinguish behaviors of the different vehicle and the person at the time of occurrence of the accident event.

As described above, the lighting information on the traffic signal that each of the different vehicles needs to obey at the time of occurrence of the event is superimposed on the event recording data of the present embodiment. With this configuration, by checking the event recording data, it is possible to easily distinguish behaviors of the different vehicles at the time of occurrence of the event, such as an accident.

Meanwhile, while the two different vehicles such as the different vehicle C2 and the different vehicle C3 are illustrated as the different vehicles in FIG. 3 and FIG. 4, this is a mere example, and the present disclosure is not limited to this example. In the present disclosure, for example, even in an event such as a single vehicle crash in which only a single different vehicle is involved or an event in which a plurality of vehicles including three or more different vehicles are involved, it is possible to easily distinguish behaviors of all of the different vehicles.

Furthermore, in FIG. 3 and FIG. 4, the traffic guide information that the different vehicles need to obey is illustrated using the word balloons, but this is a mere example, and the present disclosure is not limited to this example.

Figure 5:
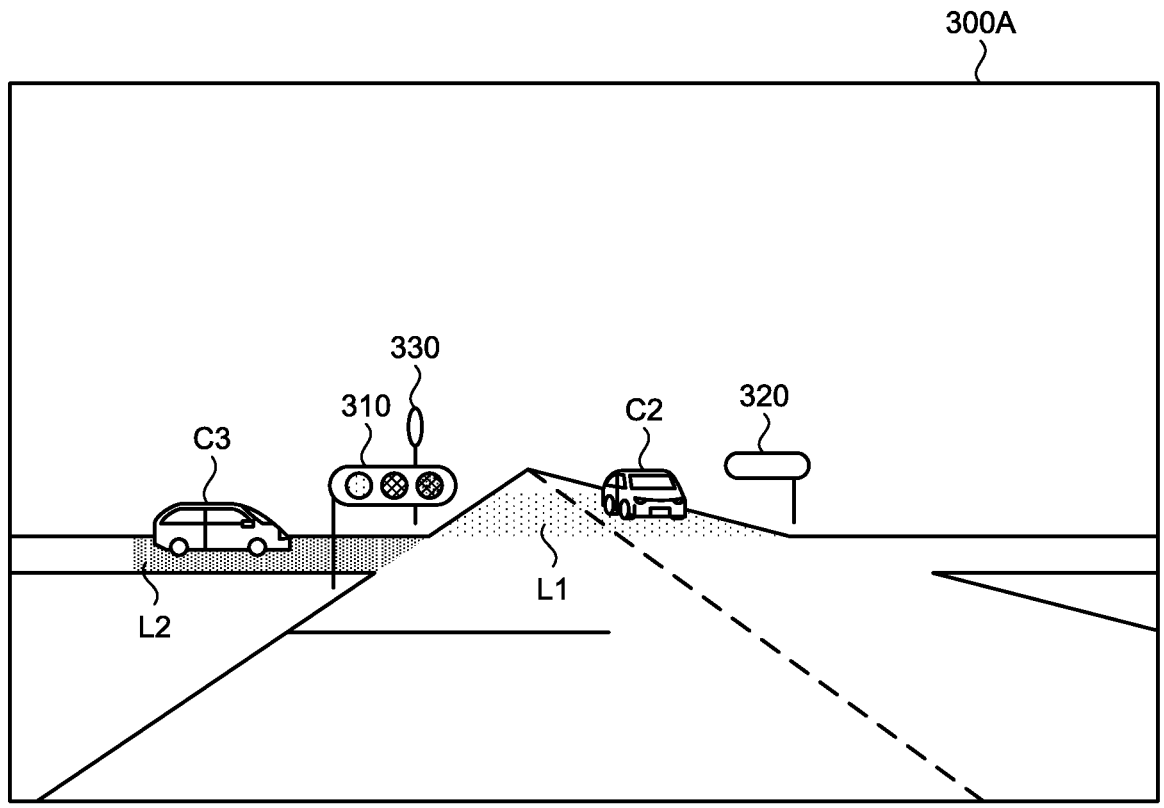
FIG. 5 is a diagram illustrating an example of a video that is obtained before event detection, with respect to event recording data based on event detection according to the present embodiment.
Figure 6:
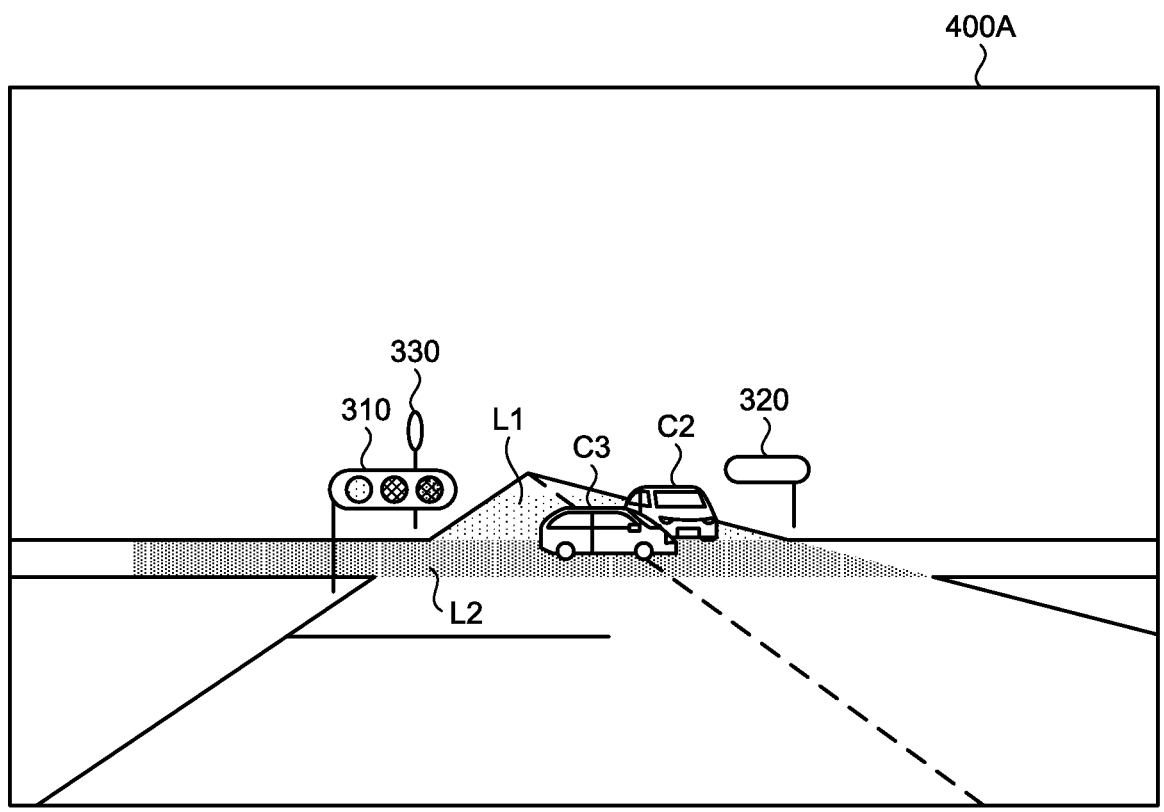
FIG. 6 is a diagram illustrating an example of a video that is obtained at the time of the event detection, with respect to the event recording data based on the event detection according to the present embodiment.

Referring to FIG. 5 and FIG. 6, processes that are performed by the video recording system 1 and that are different from the processes illustrated in FIG. 3 and FIG. 4 will be described. FIG. 5 is a diagram illustrating an example of a video that is different from the video in FIG. 3 and that is obtained before event detection, with respect to event recording data based on event detection according to the present embodiment. FIG. 6 is a diagram illustrating an example of a video that is different from the video in FIG. 4 and that is obtained at the time of the event detection, with respect to the event recording data based on the event detection according to the present embodiment.

As illustrated in FIG. 5, the display control unit 127 displays, as the corresponding traffic guide information 32, a region L1 in a superimposed manner on a lane where the different vehicle C2 travels in event recording data 300A, for example. In this case, for example, the display control unit 127 displays the region L1 in a green color in accordance with the lighting information on the second traffic signal 320.

Furthermore, the display control unit 127 displays, as the corresponding traffic guide information 32, a region L2 in a superimposed manner on a lane where the different vehicle C3 travels in the event recording data 300A, for example. In this case, for example, the display control unit 127 displays the region L2 in a red color in accordance with the lighting information on the third traffic signal 330.

When an accident is occurred between the different vehicle C2 and the different vehicle C3, the region L1 is superimposed on the lane in the event recording data 400A where the different vehicle C2 travels and the region L2 is superimposed on the lane in the event recording data 400A where the different vehicle C3 travels. In other words, in the event recording data 400A, the traffic guide information that the different vehicle C2 needs to obey and the traffic guide information that the different vehicle C3 needs to obey at the time of occurrence of the event are indicated.

As described above, in the examples illustrated in FIG. 5 and FIG. 6, the lighting information on the traffic signal that each of the different vehicles needs to obey is superimposed on the lane where each of the different vehicles travels. With this configuration, by checking the event recording data, it is possible to easily distinguish behaviors of the different vehicles at the time of occurrence of an event, such as an accident.

In FIG. 3 to FIG. 6, the explanation has been given based on the assumption that the traffic guide information is a traffic signal, but this is a mere example, and the present disclosure is not limited to this example. As described above, in the present embodiment, the traffic guide information may be a traffic sign.

Figure 7:
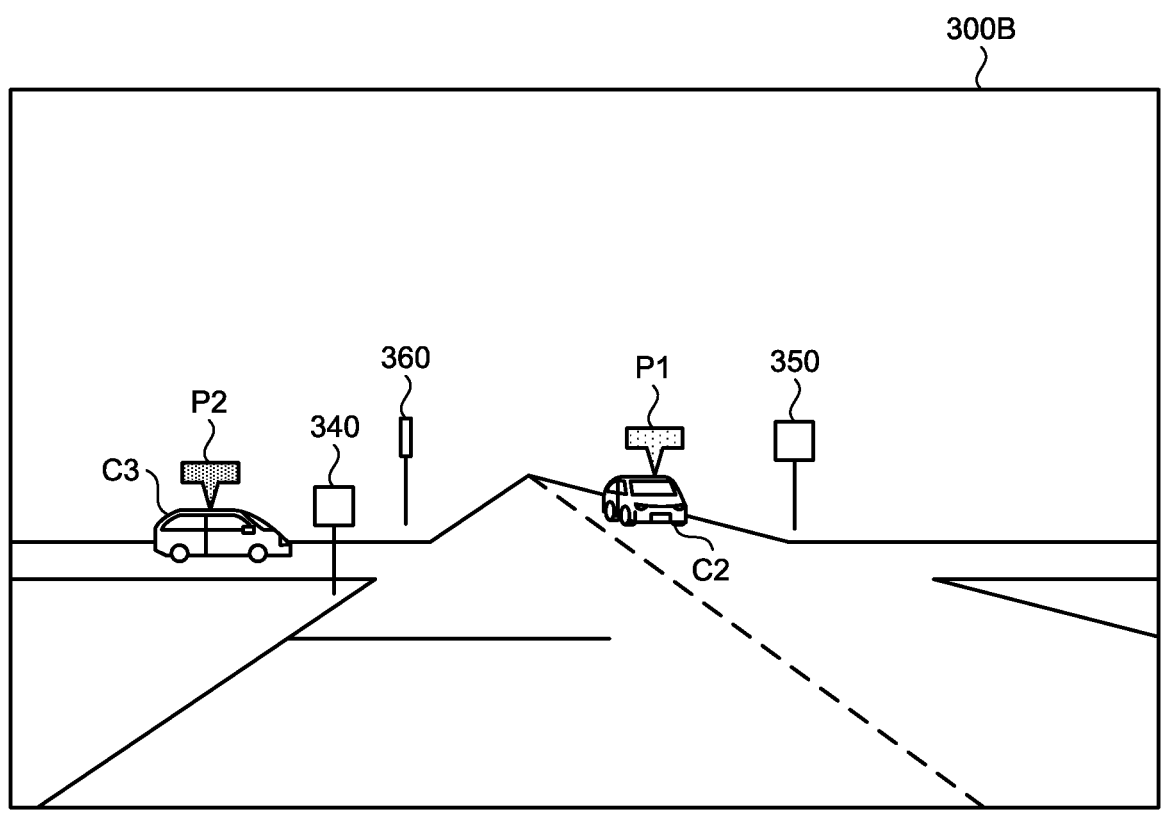
FIG. 7 is a diagram illustrating an example of a video that is obtained before event detection, with respect to event recording data based on event detection according to the present embodiment.

Referring to FIG. 7, a process performed when the traffic guide information is a sign will be described. FIG. 7 is a diagram illustrating an example of a video that is obtained before event detection in a case where the traffic guide information is a traffic sign, with respect to event recording data based on event detection according to the present embodiment. Meanwhile, the processes at the time of event detection are the same as those illustrated in FIG. 4 and FIG. 6, and therefore, explanation thereof will be omitted.

Event recording data 300B illustrated in FIG. 7 includes a first traffic sign 340, a second traffic sign 350, and a third traffic sign 360. The first traffic sign 340 is a traffic sign that the subject vehicle C1 needs to obey. The second traffic sign 350 is a traffic sign that the different vehicle C2 needs to obey. The third traffic sign is a traffic sign that the different vehicle C3 needs to obey.

The traffic guide information correspondence determination unit 130 associates traffic guide information on the second traffic sign 350 with the different vehicle C2. In the example illustrated in FIG. 7, if the second traffic sign 350 indicates a "through street", the traffic guide information correspondence determination unit 130 associates the traffic guide information on the second traffic sign 350 indicating a "through street" with the different vehicle C2, for example. The traffic guide information correspondence determination unit 130 associates traffic guide information on the third traffic sign 360 with the different vehicle C3. In the example illustrated in FIG. 7, if the third traffic sign indicates "halt", the traffic guide information correspondence determination unit 130 associates the traffic guide information on the third traffic signal 330 indicating "halt" with the different vehicle C3.

Then, as illustrated in FIG. 7, the display control unit 127 displays, as the corresponding traffic guide information 32, the word balloon P1 in a superimposed manner at a position corresponding to the different vehicle C2 in the event recording data 300B, for example. In this case, for example, the display control unit 127 displays a traffic sign indicating a "through street" in the word balloon P1. Further, for example, the display control unit 127 may display text, such as "the second traffic sign 350 indicates a through street", in the word balloon P1.

Furthermore, for example, the display control unit 127 displays, as the corresponding traffic guide information 32, the word balloon P2 in a superimposed manner at a position corresponding to the different vehicle C3 in the event recording data 300B. In this case, for example, the display control unit 127 displays a traffic sign indicating "halt" in the word balloon P2. Moreover, for example, the display control unit 127 may display text, such as "the third traffic sign 360 indicates halt", in the word balloon P2.

In FIG. 7, explanation has been given based on the assumption that the traffic signs indicate a through street and halt, but this is a mere example, and the present disclosure is not limited to this example. The traffic sign may be a traffic sign indicating a speed limit. In this case, it may be possible to display a traffic sign of a speed limited or text, such as "a speed limit is XX km", in a word balloon. Meanwhile, even when the traffic guide information indicates a traffic sign, a process that is performed after detection of an event is the same as the process that is performed when the traffic guide information indicates a traffic signal, and therefore, explanation thereof will be omitted.

As described above, in the example illustrated in FIG. 7, a display content of a traffic sign that each of the different vehicles needs to obey is superimposed on the lane where each of the different vehicles travels. With this configuration, by checking the event recording data, it is possible to easily distinguish behaviors of the different vehicles at the time of occurrence of an event, such as an accident.

[Process Performed by Video Recording Control Device 100]

Figure 8:
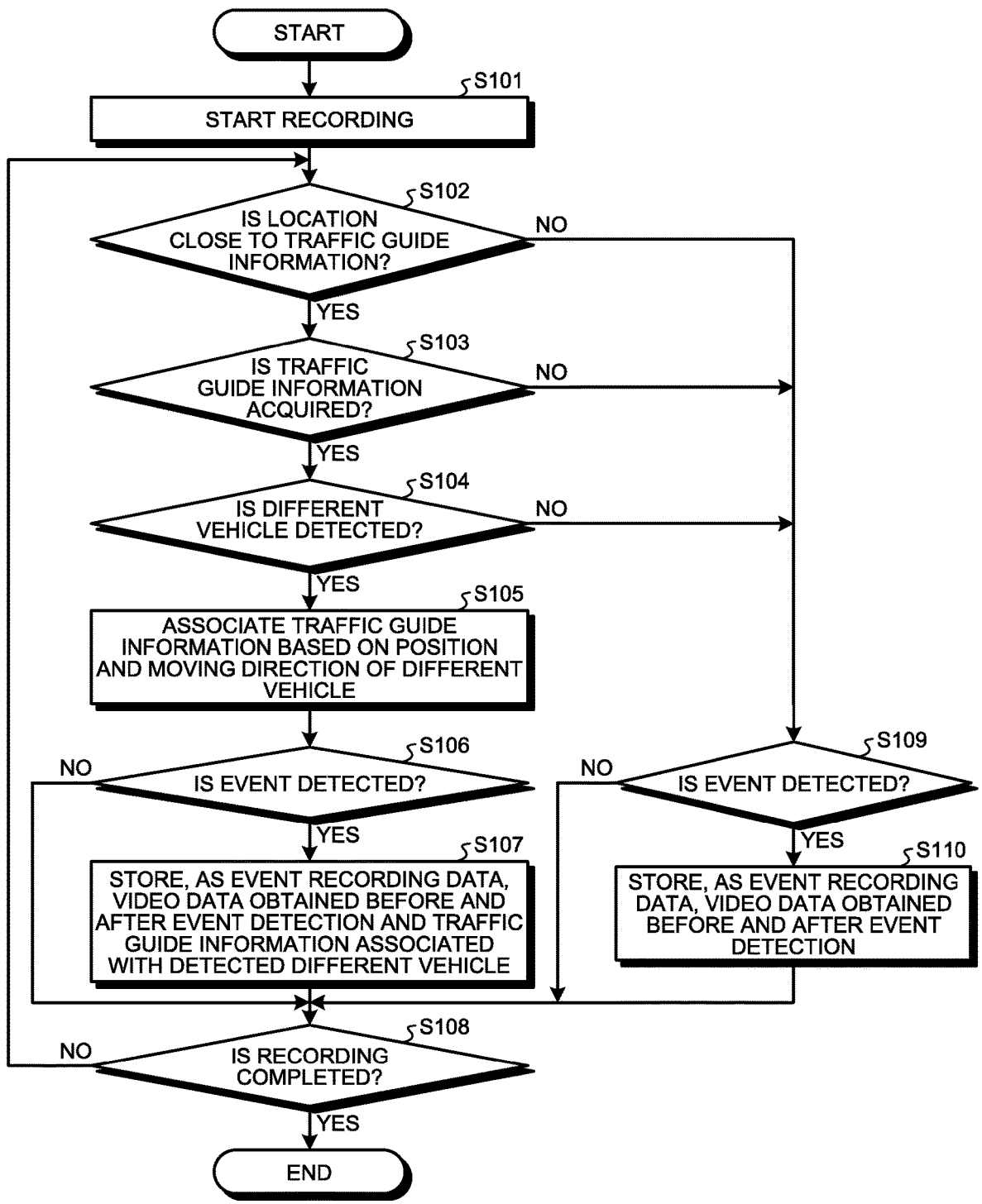
FIG. 8 is a flowchart illustrating an example of the flow of a process performed by a video recording control device according to the present embodiment.

Referring to FIG. 8, a process performed by the video recording control device 100 according to the present embodiment will be described. FIG. 8 is a flowchart illustrating an example of the flow of the process performed by the video recording control device 100 according to the present embodiment.

First, the video recording control device 100 starts to record video data that is captured by the camera 10 (Step S101). Specifically, the video recording control device 100 causes the data acquisition unit 120 to acquire the video data from the camera 10 and stores the video data in the buffer memory 121. Then, the video recording control device 100 proceeds to Step S102.

At Step S102, the video recording control device 100 determines whether a location is close to the traffic guide information, such as a traffic signal. Specifically, the video recording control device 100 causes the current location calculation unit 129 to calculate a current location based on a GPS signal acquired from the GPS reception unit 70, and determines whether the traffic guide information, such as a traffic signal, is located in the vicinity of the calculated current location.

If the location is close to the traffic guide information ("Yes" at Step S102), the video recording control device 100 proceeds to Step S103, and acquires the traffic guide information. Specifically, the video recording control device 100 causes the traffic guide information acquisition unit 122 to acquire the traffic guide information. In contrast, if the location is not close to the traffic guide information ("No" at Step S102), the video recording control device 100 proceeds to Step S109.

If the traffic guide information is acquired ("Yes" at Step S103), the video recording control device 100 proceeds to Step S104 and determines whether a different vehicle is detected. Specifically, the video recording control device 100 causes the different vehicle information detection unit 125 to detect a different vehicle. In contrast, if the traffic guide information is not acquired ("No" at Step S103), the video recording control device 100 proceeds to Step S109.

If the different vehicle is detected ("Yes" at Step S104), the video recording control device 100 proceeds to Step S105, and associates the traffic guide information with the different vehicle on the basis of a position and a moving direction of the different vehicle (Step S105). Specifically, the video recording control device 100 causes the traffic guide information correspondence determination unit 130 to associate the traffic guide information with the different vehicle. Then, the video recording control device 100 proceeds to Step S106. In contrast, if the different vehicle is not detected ("No" at Step S104), the video recording control device 100 proceeds to Step S109.

At Step S106, the video recording control device 100 detects an event that has occurred to the different vehicle. Specifically, the video recording control device 100 causes the event detection unit 128 to detect an event that has occurred to the different vehicle.

If the event is detected ("Yes" at Step S106), the video recording control device 100 proceeds to Step S107. Then, the video recording control device 100 stores, as the event recording data, video data before and after the event detection and the traffic guide information associated with the detected different vehicle in the storage unit 30 (Step S107). Specifically, the video recording control device 100 causes the storage control unit 123 to store the event recording data in the storage unit 30. Then, the video recording control device 100 proceeds to Step S108. In contrast, if the event is not detected ("No" at Step S106), the process proceeds to Step S108.

If recording is not completed ("No" at Step S108), the video recording control device 100 returns to Step S102 and continues the process in FIG. 8. In contrast, if recording is completed ("Yes" at Step S108), the video recording control device 100 terminates the process in FIG. 8.

Further, at Step S109, the video recording control device 100 detects an event that has occurred to the different vehicle. Specifically, the video recording control device 100 causes the event detection unit 128 to detect the event that has occurred to the different vehicle.

If the event is detected ("Yes" at Step S109), the video recording control device 100 stores, as the event recording data, video data obtained before and after the event detection in the storage unit 30 (Step S110). Specifically, the video recording control device 100 causes the storage control unit 123 to store the event recording data in the storage unit 30. Then, the video recording control device 100 proceeds to Step S108 and performs the process as described above. In contrast, if the event is not detected ("No" at Step S109), the video recording control device 100 proceeds to Step S108 and performs the process as described above.

The embodiments of the present disclosure have been described above; however, embodiments are not limited by the contents of the embodiments as described above. Further, structural elements described above include one that can be easily thought of by a person skilled in the art and one that is within an equivalent range. Furthermore, the structural elements described above may be appropriately combined. Moreover, within the scope not departing from the gist of the embodiments described above, various omission, replacement, and modifications of the structural elements may be made.

According to one aspect of the present disclosure, it is possible to easily distinguish behaviors of different vehicles at the time of occurrence of an event, such as an accident.

What is claimed is:

1. A video recording control device comprising:
   a data acquisition circuit configured to acquire video data that is captured by a camera configured to capture a video of surroundings of a subject vehicle;
   a traffic guide information acquisition circuit configured to acquire traffic guide information that is present in a direction in which the camera captures a video;
   a different vehicle information detection circuit configured to recognize a different vehicle from the video data acquired by the data acquisition circuit, and detect a position and a moving direction of the different vehicle;

a traffic guide information correspondence determination circuit configured to associate traffic guide information that the different vehicle needs to obey with the different vehicle, based on the position and the moving direction of the different vehicle detected by the different vehicle information detection circuit;

an event detection circuit configured to detect an event in which the different vehicle is involved; and a storage control circuit configured to, when the event detection circuit detects the event, store video data corresponding to a period including at least an event occurrence time, with inclusion of the traffic guide information that is determined by the traffic guide information correspondence determination circuit as the traffic guide information that the different vehicle needs to obey, wherein the different vehicle information detection circuit further detects a transition of movement of the recognized different vehicle, the event detection circuit detects the event in which the different vehicle is involved, based on the transition of movement of the recognized different vehicle, the data acquisition circuit acquires sound data in addition to the video data, and the event detection circuit detects the event in which the different vehicle is involved, based on the transition of movement of the recognized different vehicle and the sound data.

2. The video recording control device according to claim 1, wherein the event detection circuit detects the event in which the different vehicle and the subject vehicle are involved, based on the transition of movement of the recognized different vehicle and acceleration applied to the subject vehicle.

3. The video recording control device according to claim 1, wherein the storage control circuit stores traffic guide information that the different vehicle needs to obey, as another video data for which a positional relationship is consistent with the video data corresponding to the period including at least the event occurrence time.

4. The video recording control device according to claim 1, wherein the storage control circuit stores the video data corresponding to the period including at least the event occurrence time and the traffic guide information that the different vehicle needs to obey, such that at least only the video data corresponding to the period including at least the event occurrence time is playable, and such that the video data corresponding to the period including at least the event occurrence time is playable with inclusion of the traffic guide information that the different vehicle needs to obey.

5. The video recording control device according to claim 1, wherein
the traffic guide information is one of a traffic signal and a traffic sign, and
the traffic guide information correspondence determination circuit associates a content of one of lighting information and the traffic sign that the different vehicle needs to obey with the different vehicle.

6. A video recording system comprising:
the video recording control device according to claim 1;
a camera configured to capture a video of surroundings of a subject vehicle; and
a storage configured to store video data captured by the camera.

7. A video recording method comprising:
a data acquisition step of acquiring video data that is captured by a camera configured to capture a video of surroundings of a subject vehicle;
a traffic guide information acquisition step of acquiring traffic guide information that is present in a direction in which the camera captures a video;
a different vehicle information detection step of recognizing a different vehicle from the video data acquired at the data acquisition step, and detect a position and a moving direction of the different vehicle;
a traffic guide information correspondence determination step of associating traffic guide information that the different vehicle needs to obey with the different vehicle, based on the position and the moving direction of the different vehicle detected at the different vehicle information detection step;
an event detection step of detecting an event in which the different vehicle is involved; and
a storage control step of storing, when the event is detected at the event detection step, video data corresponding to a period including at least an event occurrence time, with inclusion of the traffic guide information that is determined at the traffic guide information correspondence determination step as the traffic guide information that the different vehicle needs to obey, wherein
the different vehicle information detection step further detects a transition of movement of the recognized different vehicle,
the event detection step detects the event in which the different vehicle is involved, based on the transition of movement of the recognized different vehicle,
the data acquisition step acquires sound data in addition to the video data, and
the event detection step detects the event in which the different vehicle is involved, based on the transition of movement of the recognized different vehicle and the sound data.

8. A non-transitory storage medium that stores a video recording control program configured to cause a computer to execute:
a data acquisition step of acquiring video data that is captured by a camera configured to capture a video of surroundings of a subject vehicle;
a traffic guide information acquisition step of acquiring traffic guide information that is present in a direction in which the camera captures a video;
a different vehicle information detection step of recognizing a different vehicle from the video data acquired at the data acquisition step, and detect a position and a moving direction of the different vehicle;
a traffic guide information correspondence determination step of associating traffic guide information that the different vehicle needs to obey with the different vehicle, based on the position and the moving direction of the different vehicle detected at the different vehicle information detection step;
an event detection step of detecting an event in which the different vehicle is involved; and
a storage control step of storing, when the event is detected at the event detection step, video data corresponding to a period including at least an event occurrence time, with inclusion of the traffic guide information that is determined at the traffic guide information correspondence determination step as the traffic guide information that the different vehicle needs to obey, wherein the different vehicle information detection step further detects a transition of movement of the recognized different vehicle, the event detection step detects the event in which the different vehicle is involved, based on the transition of movement of the recognized different vehicle, the data acquisition step acquires sound data in addition to the video data, and the event detection step detects the event in which the different vehicle is involved, based on the transition of movement of the recognized different vehicle and the sound data.

\* \* \* \* \*